United States Patent [19]

Tauber

[11] Patent Number: 5,499,947
[45] Date of Patent: Mar. 19, 1996

[54] METHOD FOR MANUFACTURING AN AIR DAMPER FOR USE IN A MOTOR VEHICLE TEMPERATURE CONTROL UNIT

[75] Inventor: Werner Tauber, Redwitz, Germany

[73] Assignee: Siemens Aktiengesellschaft, München, Germany

[21] Appl. No.: 308,714

[22] Filed: Sep. 19, 1994

[30] Foreign Application Priority Data

Sep. 22, 1993 [EP] European Pat. Off. ............ 93115285

[51] Int. Cl.⁶ .................................................... B60H 1/00
[52] U.S. Cl. ..................... 454/69; 137/15; 251/314; 251/356; 29/890.124; 29/890.127
[58] Field of Search ..................... 137/15, 315; 251/314, 251/316, 317, 305, 356, 357; 454/69, 143; 29/890.12, 890.124, 890.127

[56] References Cited

U.S. PATENT DOCUMENTS

| 3,593,400 | 7/1971 | Geiselman | 29/890.127 X |
| 4,492,361 | 1/1985 | Jacquet et al. | 251/356 |
| 4,800,919 | 1/1989 | Bachmann | 251/356 X |
| 4,915,355 | 4/1990 | Fort | 251/356 X |
| 5,159,954 | 11/1992 | Janich | 251/356 X |

FOREIGN PATENT DOCUMENTS

| 2550848 | 2/1985 | France. | |
| 2704522 | 8/1978 | Germany | 454/143 |
| 85 35 024.6 | 3/1986 | Germany. | |
| 87 16 119.2 | 3/1988 | Germany. | |
| 89 11 657.7 | 12/1989 | Germany. | |

*Primary Examiner*—Harold Joyce
*Attorney, Agent, or Firm*—Kenyon & Kenyon

[57] ABSTRACT

A method for manufacturing an improved air damper for a motor vehicle temperature control unit includes a first machining process for injection-molding a sealing section to be formed into a hollow shape. One end of the sealing section is simultaneously injected onto a lower surface of a base member. In a second machining process, the other end of the sealing section is slip-fitted onto the upper surface of the base member and mechanically affixed thereto. To this end, the sealing section preferably has openings which may be positioned over corresponding fixing pins extending from the upper surface of the base member. The fixing pins may then be folded down, for example, by heat welding to lock the fixing pins over the sealing section and thereby form a hollow member. The sealing section further includes a sealing lug for abutting a housing portion of the temperature control unit, such as an interior wall of an air duct.

12 Claims, 2 Drawing Sheets

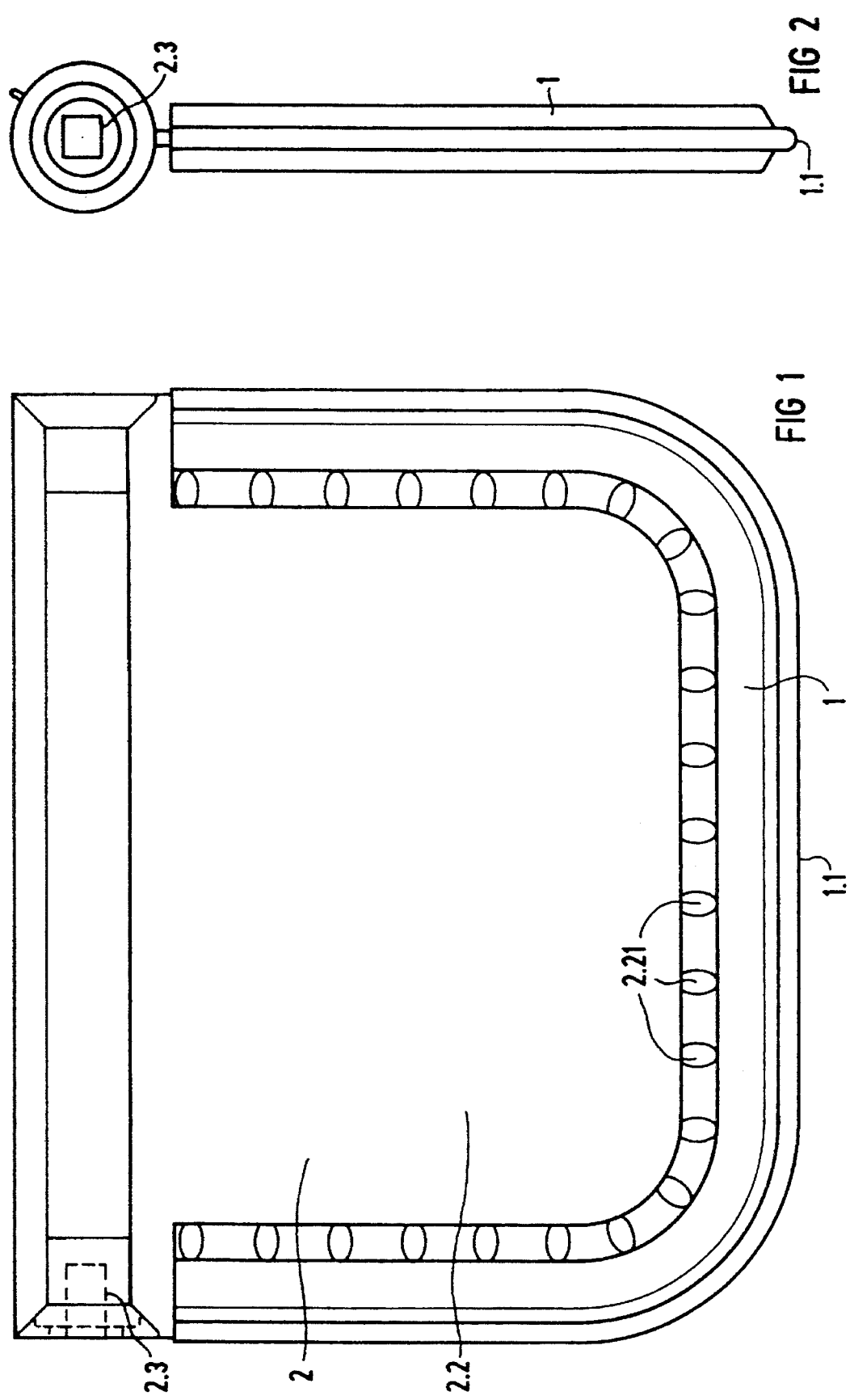

METHOD FOR MANUFACTURING AN AIR DAMPER FOR USE IN A MOTOR VEHICLE TEMPERATURE CONTROL UNIT

BACKGROUND OF THE INVENTION

The invention relates generally to the field of temperature control for motor vehicles, and in particular to an improved method for manufacturing an air damper which sealingly abuts a housing partition in a heating or air conditioning unit.

In a known temperature control unit for a motor vehicle, as disclosed by DE-U-89 11 657, an air damper is formed as a plate-shaped base member that is extrusion-coated with an elastic sealing section made of a thermo-plastic elastomer. The sealing section is substantially a solid tube, having a full circular cross-section. When the damper is in its sealing position, a sealing lip laterally abuts a flat partition section of the temperature control unit. One drawback of this approach is the solid construction of the sealing section, which inhibits the ability of the sealing section to conform to the partition.

To address this problem of limited flexibility, DE-U 87 16 119 discloses an air damper having a hollow, tube-like sealing strip. However, the sealing strip must be clamped to the outer edge of the base member, thus undesirably complicating the manufacturing process. Alternatively, it is known to inject an elastic, hollow-body sealing strip formed by gas-injection onto a base member of an air damper. Here, too, the manufacturing process is undesirably complicated.

SUMMARY OF THE INVENTION

The present invention provides a method for manufacturing an improved air damper for use in a temperature control unit of a motor vehicle. The method produces an air damper which ensures a simple and noise-free edge-side circumferential seal over the entire swiveling range of the damper, particularly where the damper is to abut a curved housing partition. Unlike known approaches to manufacturing such air dampers, the method according to the present invention requires no clamping operation and no separate gas-injection operation.

The method of the present invention requires only two machining processes to manufacture an air damper with improved circumferential sealing ability. The air damper so-produced includes a hollow sealing section with walls that may be precisely shaped in a casting or injection mold to attain a desired degree of elasticity.

The method of the present invention involves two basic steps. First, a sealing section is formed into a precise shape using a casting or injection mold. The sealing section will ultimately be formed into a hollow member extending about the circumference of a hard plastic, plate-shaped base member. In this initial forming step, however, the sealing section is formed as an open member with one end casted or injection-molded onto one side of the base member. This may be accomplished by positioning the base member at least partially within the cast or mold so that the sealing section is affixed to the underside of the base member. In the second step of the present method, the unattached end of the sealing section is pulled over to the upper side of the base member. The unattached end is then mechanically fastened to the base member, thereby forming the hollow sealing section.

To simplify fastening the unattached end of the sealing section to the base member, the sealing section may be formed with circumferential openings close to its edge. These openings may then be slip-fit onto corresponding fixing pins extending from the upper surface of the base member, after which the fixing pins may be pressed down toward the interior of the plate-shaped base member. The fixing pins thus guarantee a securing action with positive locking opposite the slip-on direction of the hollow sealing section.

Features and advantages of the present invention are described below with reference to the drawing figures; other features and advantages will be readily apparent to persons skilled in the art.

BRIEF DESCRIPTION OF THE DRAWINGS

FIG. 1 is a top view of a base member of an air damper equipped with a circumferential hollow sealing section according to an embodiment of the present invention.

FIG. 2 is a side view of the air damper shown in FIG. 1.

DETAILED DESCRIPTION

The method of the present invention is directed to manufacturing an air damper which may be used, for example, as a fresh-air ventilation damper in an air duct of a motor vehicle temperature control unit. Referring to FIG. 1, an embodiment of such an air damper includes a plate-shaped base member 2 formed, for example, from hard plastic. The base member 2 is designed to rotate about a swivel axis 2.3. The base member 2 is disposed within a housing (not shown) having flat partitions abutting the sides of the base member and a preferably curved partition abutting the edge of the base member 2 opposite the swivel axis 2.3. The curved partition ideally conforms to the swiveling radius of the base member 2.

The air damper further includes a single-piece, hollow sealing section 1 formed of a thermoplastic elastomer that is injection-molded or otherwise attached onto one side of the base member 2. The sealing section 1 includes an edge-side circumferential sealing lug 1.1 integrally formed therewith, which abuts the curved partition of the housing in which the air damper is disposed. FIG. 2 shows a side view of the air damper shown in FIG. 1. As can be seen, the sealing section extends about the circumference of the base member with the sealing lug 1.1 formed as a central rib.

Figure 3:
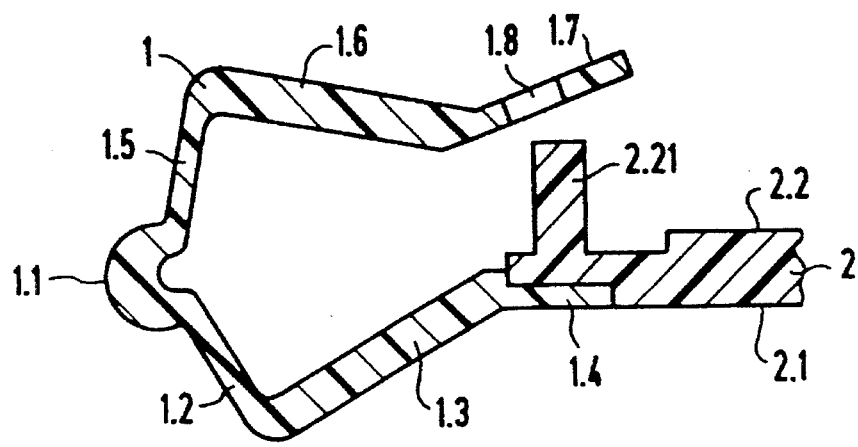
FIG. 3 is a partial section view of the air damper of FIG. 1, showing the sealing section retained on the edge of the base member after removal from a mold.
Figure 4:
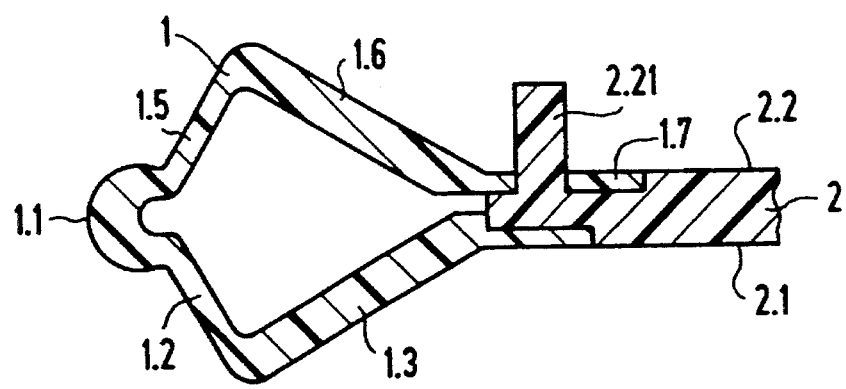
FIG. 4 shows the sealing section of FIG. 3 after the unattached end has been fit onto fixing pins extending from the base member.
Figure 5:
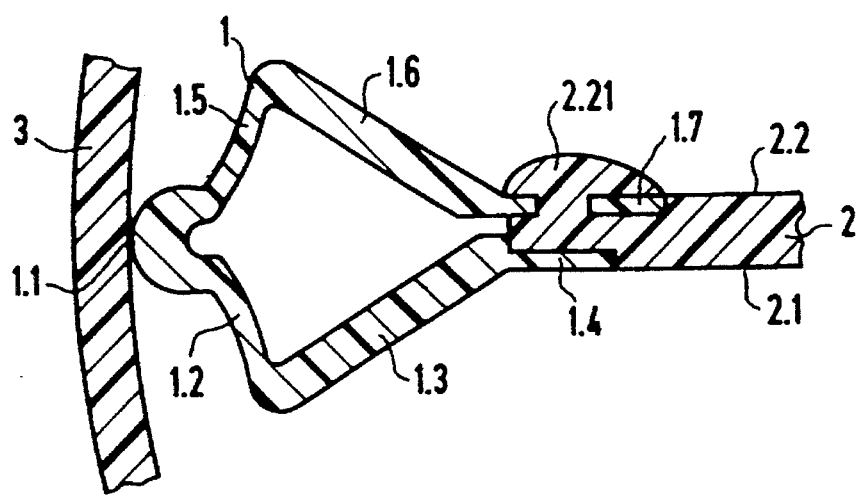
FIG. 5 shows the hollow sealing section of FIG. 4 after the fixing pins of the base member have been folded into their locking position.

FIGS. 3 through 5 illustrate a preferred embodiment of a method for manufacturing an air damper such as that shown in FIGS. 1 and 2. As can best be seen in FIG. 5, the sealing section 1 may have a predetermined shape for improved sealing performance. The sealing lug 1.1 abuts the curved front-side of housing partition 3 under an initial stress when in its closed position. The sealing lug 1.1 is capable of being elastically and flexibly deformed without significant deformation of the part of the sealing section 1 in the area of the base member 2.

According to one advantageous refinement of the present invention, the sealing section 1 has two distant wall portions 1.2, 1.5 emanating from the sealing lug 1.1 at an angle of approximately 60° from the plane of the base member 2. In addition, the sealing section 1 includes two near wall portions 1.3, 1.6 disposed at an angle of approximately 30° from the plane of the base member 2. In this embodiment, the distant wall portions 1.2, 1.5 are more elastically deformable than the near wall portions 1.3, 1.6 by virtue of a reduced wall thickness.

Referring now to FIG. 3, the sealing section 1 is preferably injection-molded as a single, pre-shaped member. A fixed end 1.4 of the sealing section 1 is attached to the lower surface 2.1 of the base member 2. Attaching the fixed end 1.4 to the base member 2 may advantageously be accomplished simultaneously with the forming of the sealing section 1 by positioning at least an edge portion of the lower surface 2.1 of the base member 2 within the injection or casting mold.

The sealing section 1 as formed in the injection or casting mold includes an unattached end 1.7 with openings 1.8 distributed along the edge areas of the sealing section 1 to facilitate securing the unattached end 1.7 to the base member 2. Conversely, the base member 2 includes a corresponding number of fixing pins 2.21 distributed along the edge of its upper surface 2.2. The openings 1.8 and the fixing pins 2.21 cooperate to secure the unattached end of the sealing section 1 to the base member 2.

As just described, the sealing section 1 is molded with a fixed end 1.4 attached to the base member 2 and an unattached end 1.7. The unattached end 1.7 may be slip-fit onto the base member 2 in a simple second machining operation. As shown in FIG. 3, the unattached end 1.7 is removed from the mold (not shown) in which it was formed. The unattached end 1.7 is then pulled over the upper surface 2.2 of the base member 2 so that the fixing pins 2.21 extend through the openings 1.8, as shown in FIG. 4. Finally, the fixing pins 2.21 are pressed flat, preferably through heat welding, in a direction away from the hollow sealing section 1. As shown in FIG. 5, the fixing pins 2.2 provide positive locking of the hollow sealing section 1 onto the base member 2.

As is apparent from the foregoing description, the present invention provides a simple method for manufacturing an air damper requiring a minimum of manufacturing steps to produce a damper with superior sealing characteristics. While the method has been described with reference to a specific embodiment, it will be apparent to those skilled in the art that many modifications and variations are possible. Accordingly, the present invention embraces all alternatives, modifications and variations that fall within the spirit and scope of the appended claims, as well as all equivalents thereof.

What is claimed:

1. A method for manufacturing an air damper for sealingly abutting a housing partition in a temperature control unit of a motor vehicle, wherein the damper includes a base member with a rubber-elastic hollow sealing section affixed about an edge portion thereof, said method comprising the steps of:

(a) molding the sealing section to form a fixed end injected onto a first surface of the base member, the sealing section having a sealing lug for contacting the housing partition, an unattached end, and wall portions respectively extending from the sealing lug to the fixed and unattached ends, wherein the wall portions have a predetermined shape and thickness; and (b) mechanically fastening the unattached end of the sealing section to the base member along an edge portion of a second surface of the base member opposing the first surface, said step of fastening including a substep of slip-fitting the unattached end of the sealing section onto the second surface.

2. The method of claim 1, wherein said step of molding the sealing section comprises a first machining process wherein the sealing section is shaped in a mold and concurrently injected onto the first surface of the base member, after which the sealing section is removed from the mold by force.

3. The method of claim 1, wherein the sealing section comprises an injection-molded thermoplastic elastomer material.

4. The method of claim 1, wherein said step of slip-fitting the unattached end comprises fitting openings near an edge of the unattached end of the sealing section onto corresponding fixing pins extending from the second surface of the base member.

5. The method of claim 4, wherein the fixing pins comprise a hard, plastic-like material.

6. The method of claim 4, wherein said step of mechanically fastening the unattached end comprises pressing down and stretching out the fixing pins across the slip-fitted unattached end in a direction away from the sealing lug.

7. The method of claim 6, wherein the fixing pins are heat welded.

8. The method of claim 1, wherein the sealing lug is capable of abutting a curved housing partition of the temperature control unit during a movement of the base member about a swiveling axis.

9. The method of claim 1, wherein each of the wall portions of the sealing section comprises a first section respectively rising or falling from the sealing lug at an angle of approximately 60° with respect to a plane of the base member, and an adjoining second section respectively falling or rising at an angle of approximately 30° with respect to the plane of the base member, with the second sections respectively merging into either the unattached or fixed ends of the sealing section.

10. The method of claim 9, wherein each of the first sections is formed with a reduced wall thickness as compared to the adjoining second sections, whereby the first sections have a greater elastic flexibility.

11. The method of claim 1, wherein the sealing section includes outside openings in an area near a swivel axis of the base member.

12. The method of claim 1, wherein the damper comprises a fresh-air ventilation air damper for a motor vehicle temperature control unit.

\* \* \* \* \*